(12) United States Patent
Kinomura

(10) Patent No.: US 12,043,137 B2
(45) Date of Patent: Jul. 23, 2024

(54) POWER SUPPLY SYSTEM

(71) Applicant: TOYOTA JIDOSHA KABUSHIKI KAISHA, Aichi-ken (JP)

(72) Inventor: Shigeki Kinomura, Toyota (JP)

(73) Assignee: TOYOTA JIDOSHA KABUSHIKI KAISHA, Aichi-Ken (JP)

(*) Notice: Subject to any disclaimer, the term of this patent is extended or adjusted under 35 U.S.C. 154(b) by 1 day.

(21) Appl. No.: 17/715,035

(22) Filed: Apr. 7, 2022

(65) Prior Publication Data

US 2022/0324347 A1  Oct. 13, 2022

(30) Foreign Application Priority Data

Apr. 9, 2021 (JP) .................. 2021-066498

(51) Int. Cl.
| | |
|---|---|
| B60L 53/68 | (2019.01) |
| B60L 53/31 | (2019.01) |
| B60L 53/36 | (2019.01) |
| B60L 53/66 | (2019.01) |
| G01C 21/34 | (2006.01) |

(52) U.S. Cl.
CPC .............. B60L 53/68 (2019.02); B60L 53/31 (2019.02); B60L 53/36 (2019.02); B60L 53/66 (2019.02); G01C 21/3469 (2013.01)

(58) Field of Classification Search
None
See application file for complete search history.

(56) References Cited

U.S. PATENT DOCUMENTS

| | | | |
|---|---|---|---|
| 2013/0193918 A1* | 8/2013 | Sarkar | B60L 3/04 |
| | | | 320/109 |
| 2015/0002091 A1 | 1/2015 | Nakayama | |
| 2018/0253972 A1 | 9/2018 | Nishida et al. | |
| 2018/0272875 A1* | 9/2018 | Fontana | G06F 21/44 |
| 2018/0373268 A1* | 12/2018 | Antunes Marques Esteves | |
| | | | H04W 4/023 |
| 2021/0252989 A1* | 8/2021 | Price | B60L 53/31 |
| 2022/0063440 A1* | 3/2022 | Goldman-Shenhar | |
| | | | B60L 58/13 |
| 2022/0348097 A1* | 11/2022 | Garofalo | B60L 53/16 |

FOREIGN PATENT DOCUMENTS

| | | |
|---|---|---|
| JP | 5475407 B2 | 4/2014 |
| JP | 2018-148782 A | 9/2018 |
| WO | 2013/128554 A1 | 9/2013 |
| WO | 2019/215423 A1 | 11/2019 |

* cited by examiner

Primary Examiner — Todd Melton
Assistant Examiner — Jason R Roberson
(74) Attorney, Agent, or Firm — HAUPTMAN HAM, LLP

(57) ABSTRACT

A power supply system includes a plurality of charging stations accommodatable under a ground surface. The power supply system comprises a determination unit that determines a power supply facility available for supplying power to a target vehicle, and a transmission unit that transmits, to the target vehicle, guidance information for guiding the target vehicle to the determined charging station by automatic driving. The target vehicle is guided to the available charging station by automatic driving. The user can reach the available charging station without searching for it.

13 Claims, 5 Drawing Sheets

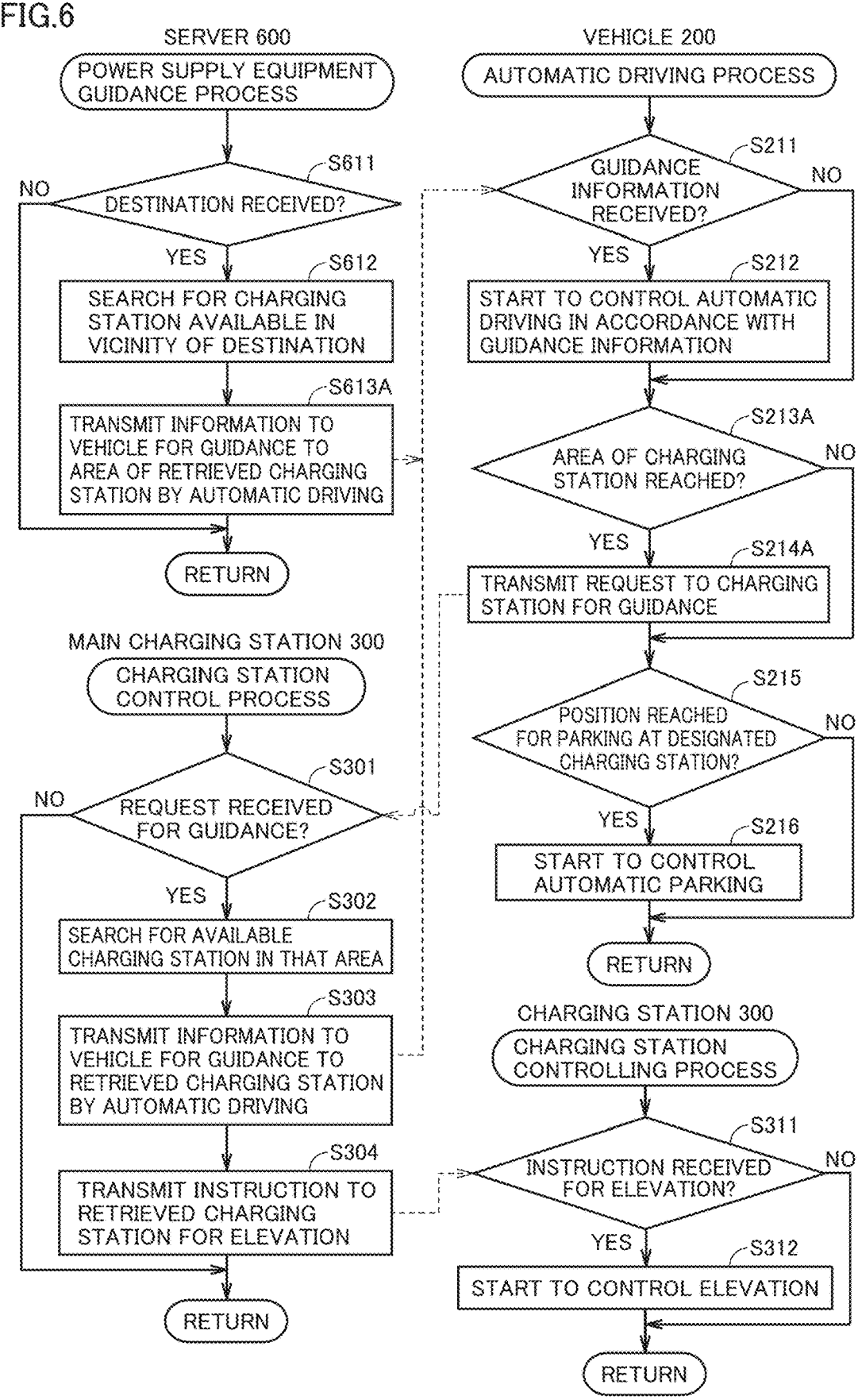

POWER SUPPLY SYSTEM

This nonprovisional application is based on Japanese Patent Application No. 2021-066498 filed on Apr. 9, 2021 with the Japan Patent Office, the entire contents of which are hereby incorporated by reference.

BACKGROUND

Field

The present disclosure relates to a power supply system, and more specifically to a power supply system comprising a plurality of power supply facilities each accommodatable under a ground surface.

Description of the Background Art

Japanese Patent No. 5475407 discloses power supply equipment that can be accommodated under a ground surface. The power supply equipment comprises a base pole (a fixed portion) and a charging pole (a movable portion). The user can pull out the charging pole above the ground surface by holding a handle that is provided on a top surface (or a ceiling portion) of the charging pole accommodated under the ground surface, and pulling the charging pole upward.

SUMMARY

When such power supply equipment as disclosed in Japanese Patent No. 5475407 is not used, it is accommodated under a ground surface, and it is difficult for a user to understand where the power supply equipment is located or determine whether the power supply equipment is available.

The present disclosure has been made in order to solve the above problems, and an object of the present disclosure is to provide a power supply system allowing a user to reach power supply equipment without searching for it.

A power supply system according to the present disclosure is a power supply system including a plurality of power supply facilities each accommodatable under a ground surface, the power supply system comprising: a determination unit that determines a power supply facility available for supplying power to a target vehicle; and a transmission unit that transmits, to the target vehicle, guidance information for guiding the target vehicle to the determined power supply facility by automatic driving.

According to this configuration, a power supply facility available for supplying power to the target vehicle is determined, and guidance information is transmitted to the target vehicle for guiding the target vehicle to the determined power supply facility by automatic driving. Thus, the target vehicle is guided to the available power supply facility by automatic driving. As a result, the user can reach the available power supply facility without searching for it.

Each power supply facility includes: a movable portion that has a power supply port and is displaced within a movability range including a first position in which the power supply port is accommodated under a ground surface and a second position in which the power supply port is exposed on the ground surface; an actuator that moves the movable portion; and a controller that controls the actuator, wherein the controller of the power supply facility determined by the determination unit may control the actuator to displace the movable portion to the second position, as timed as prescribed for parking the target vehicle at a power supplying position of that power supply facility.

According to this configuration, the movable portion of the determined power supply facility is displaced to the second position in which the power supply port is exposed on the ground surface, as timed as prescribed for parking the target vehicle at a power supplying position of the determined power supply facility. This can present a sense of welcomeness to the user and thus receive a high level of satisfaction from the user.

Each power supply facility may include the determination unit and the transmission unit. The power supply system may further comprise a server capable of communicating with each of the plurality of power supply facilities, and the server may include the determination unit and the transmission unit.

The determination unit may determine a power supply facility available for supplying power in a vicinity of a destination of the target vehicle. The transmission unit may transmit the guidance information to the target vehicle at a time when the power supply facility is determined. The transmission unit may transmit the guidance information to the target vehicle at a time when the target vehicle reaches a predetermined position set for the power supply facility determined by the determination unit.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 6 is a flowchart of a process performed in a power supply system according to a second embodiment before a vehicle reaches a charging station.

DESCRIPTION OF THE PREFERRED EMBODIMENTS

First Embodiment

The present disclosure will now be described in embodiments hereinafter in detail with reference to the drawings. In the figures, identical or corresponding components are identically denoted and will not be described repeatedly.

Figure 1:
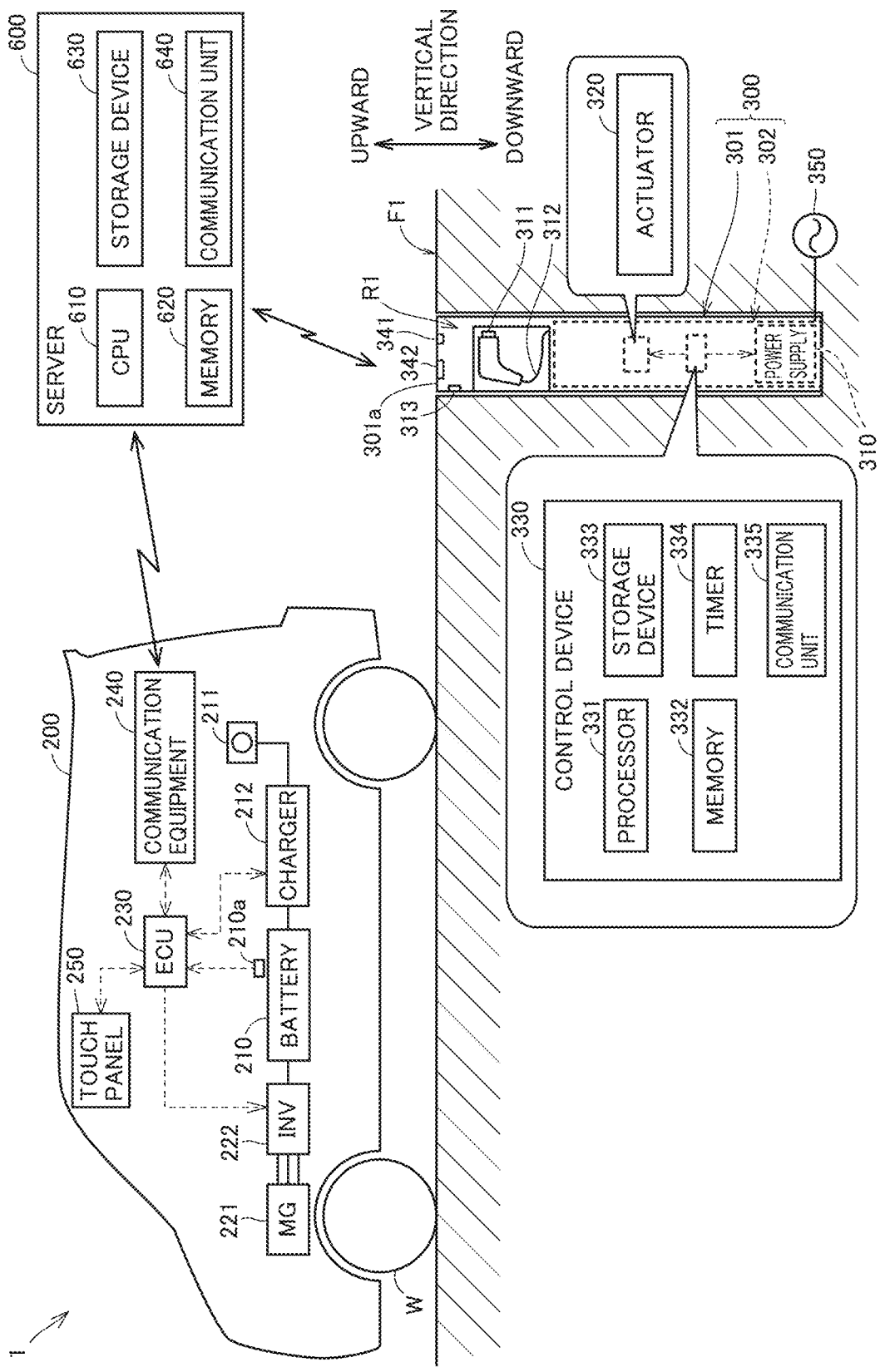
FIG. 1 is a diagram showing a configuration of a vehicle and power supply equipment according to an embodiment.

FIG. 1 is a diagram showing a configuration of a vehicle and power supply equipment according to the present embodiment. A plurality of units of power supply equipment included in a power supply system 1 according to the present embodiment are each a charging station 300 shown in FIG. 1. Charging station 300 corresponds to EVSE (Electric Vehicle Supply Equipment).

Referring to FIG. 1, charging station 300 is configured to be accommodatable under a ground surface F1. Charging station 300 corresponds to power supply equipment of an underground type (power supply equipment that can be accommodated under a ground surface). A state of charging station 300 shown in FIG. 1 is a state in which charging station 300 is accommodated under ground surface F1 (hereinafter also referred to as an "accommodated state").

Charging station 300 includes a movable portion 301 and a fixed portion 302. Movable portion 301 and fixed portion 302 each have a cylindrical casing. Each casing may be made of metal or may be made of plastic. Each casing may have a waterproofed surface. The casing of movable portion 301 is larger in diameter than the casing of fixed portion 302 and disposed outside the casing of fixed portion 302 such that the central axes of the casings match each other. Movable portion 301 is displaceable in the vertical direction (an upward/downward direction) along an outer peripheral surface of fixed portion 302.

Charging station 300 is installed in a recess R1 extending downward from ground surface F1. In the accommodated state, charging station 300 is entirely accommodated inside recess R1. Fixed portion 302 is fixed to the bottom surface of recess R1. Fixed portion 302 has a power supply circuit 310, an actuator 320, and a control device 330 in the casing. Movable portion 301 is driven by actuator 320 and displaced relative to fixed portion 302. A seal member (not shown) may be provided in a gap between the outer peripheral surface of the casing of movable portion 301 and an internal wall of recess R1.

Movable portion 301 has a space for accommodating a connector 311 and a power feed cable 312 (hereinafter referred to as a "cable accommodating portion"). The cable accommodating portion is for example a recess formed on a side surface of movable portion 301 by processing a portion of the cylindrical casing of movable portion 301. Connector 311 is provided at a first end of power feed cable 312. A second end of power feed cable 312 (an end opposite to the first end) is connected to power supply circuit 310 via an electric wire (not shown). In the accommodated state, movable portion 301 has connector 311 and power feed cable 312 in the cable accommodating portion. In the present embodiment, connector 311 corresponds to an example of a "power feed port" according to the present disclosure. Power feed cable 312 (including connector 311) may be configured to be detachably attachable to movable portion 301. In movable portion 301 with power feed cable 312 removed, a connector for power feed cable 312 (that is, a portion to which power feed cable 312 is attached) corresponds to a power feed port of movable portion 301.

Power supply circuit 310 is configured to receive power from an AC power supply 350 and supply power to movable portion 301 (more specifically, power feed cable 312). AC power supply 350 supplies AC power to power supply circuit 310. AC power supply 350 may be a commercial power supply (e.g., a power system provided by a power company). Power supply circuit 310 is controlled by control device 330.

Power feed cable 312 is elastic and flexible. The cable accommodating portion may be provided with a cable reel configured to be capable of winding power feed cable 312 thereon. The cable reel may be a mechanical automatic winding device (e.g., a spring-loaded cable reel). A lid (not shown) may also be provided for opening and closing the cable accommodating portion. A sensor may be provided in the cable accommodating portion to sense whether connector 311 and power feed cable 312 are accommodated in the cable accommodating portion.

In the accommodated state, movable portion 301 has a top surface 301a flush with ground surface F1. Actuator 320 is configured to directly or indirectly provide driving force to movable portion 301 to move movable portion 301 in the vertical direction (see FIG. 2, which will be described hereinafter). Actuator 320 may be an electric actuator that generates driving force by using power supplied from power supply circuit 310. Movable portion 301 may be displaced by a mechanism of a rack and pinion type. For example, a rack gear may be fixed to movable portion 301, and actuator 320 may rotate and thus drive a pinion gear meshed with the rack gear. Alternatively, a rod connected to a piston may be fixed to movable portion 301, and actuator 320 may move the piston hydraulically or pneumatically. Alternatively, actuator 320 may use power to generate magnetic force, and use the generated magnetic force to directly provide driving force to movable portion 301. Actuator 320 is controlled by control device 330.

Figure 2:
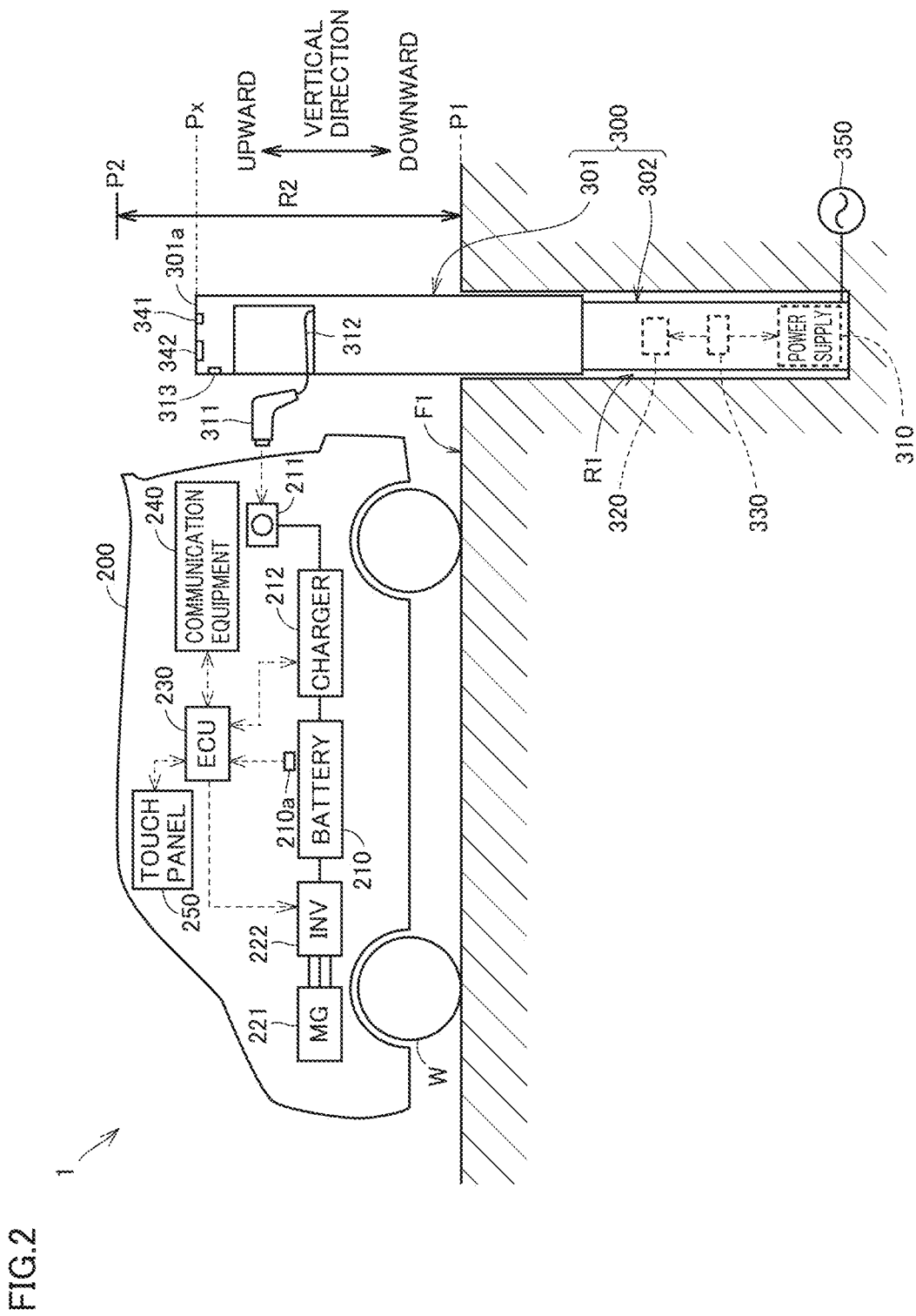
FIG. 2 shows a state in which a movable portion is elevated.

FIG. 2 shows a state in which movable portion 301 is elevated. Referring to FIG. 2, movable portion 301 is displaced (or ascends and descends) in the vertical direction so as to change a position Px of top surface 301a. Hereinafter, for convenience of description, position Px of top surface 301a of movable portion 301 is regarded as the position of movable portion 301.

Movable portion 301 is configured to be displaced within a movability range R2. Movability range R2 has a lower limit position P1 equal in level to ground surface F1. When the position of movable portion 301 is lower limit position P1, movable portion 301 (including the cable accommodating portion) is entirely accommodated under ground surface F1. When the position of movable portion 301 is higher than lower limit position P1, at least a portion of movable portion 301 is exposed above ground surface F1. Movability range R2 has an upper limit position P2 set to a position sufficiently high in level relative to an inlet of a typical vehicle. When the position of movable portion 301 is upper limit position P2, movable portion 301 has the cable accommodating portion (connector 311 and power feed cable 312) exposed above ground surface F1. Even when the position of movable portion 301 is lower than upper limit position P2 (e.g., position Px shown in FIG. 2), the cable accommodating portion can be exposed above ground surface F1. Thus, movability range R2 includes a first position (for example, lower limit position P1) in which a power feed port is accommodated under the ground surface and a second position (for example, upper limit position P2) in which the power feed port is exposed above the ground surface. While in the present embodiment, lower limit position P1 is the same position as ground surface F1, lower limit position P1 may be set at a position lower than ground surface F1.

Referring again to FIG. 1, movable portion 301 further includes a communication device 341, a notification device 342, and a touch panel display 313. Communication device 341 is configured to be capable of wirelessly communicating with a server 600 described hereinafter. Communication device 341 may be configured to be also capable of communicating with a communication device other than server 600. Communication device 341 receives information from outside charging station 300 and transmits the received information to control device 330. Control device 330 sequentially transmits a state of charging station 300 to server 600 via communication device 341.

Notification device 342 is provided near top surface 301a of movable portion 301. In the present embodiment, notification device 342 includes a lamp and a speaker. The lamp may be an LED (light emitting diode) lamp. Control device 330 controls the lamp's state (for example to turn on/flash/ turn off the lamp). Control device 330 controls the speaker to provide audible notification (including speech). Touch panel display 313 receives an input from a user and displays various information. Touch panel display 313 is configured to receive instructions for supplying power (for example, instructions to start and stop supplying power). Touch panel display 313 is also configured to display a power supply status of charging station 300 (that is, whether it is supplying power or stops supplying power). Touch panel display 313 is controlled by control device 330.

Control device 330 may be a computer. Control device 330 includes a processor 331, a memory 332, a storage device 333, a timer 334, and a communication unit 335. Processor 331 can for example be a CPU (Central Processing Unit). Memory 332 stores programs, and in addition, information used in the programs (e.g., maps, mathematical expressions, and various parameters). In the present embodiment, processor 331 executes a program stored in memory 332 to execute various types of control in charging station 300. Note, however, that the various types of control in charging station 300 are not limited to execution by software, and can be executed by dedicated hardware (or electronic circuitry). Control device 330 may include any number of processors, and each processor may be prepared for a predetermined control. Storage device 333 is configured to be capable of saving stored information. Communication unit 335 is an interface with communication device 341.

Timer 334 is configured to inform processor 331 that a set time arrives. When the time set in timer 334 arrives, timer 334 signals processor 331 accordingly. Timer 334 may be hardware (a timer circuit) or may be implemented by software. Further, control device 330 can obtain the current time using a real-time clock (RTC) circuit (not shown) incorporated in control device 330.

Vehicle 200 shown in FIGS. 1 and 2 is an electrically driven vehicle including a battery 210, a device (e.g., a motor generator (hereinafter referred to as "MG") 222 and an inverter (hereinafter referred to as an "INV") 221, which will be described hereinafter) for traveling by using power stored in battery 210, and a device (e.g., an inlet 211 and a charger 212 described hereinafter) for charging battery 210 by utilizing charging station 300. Vehicle 200 according to the present embodiment is a battery electric vehicle (BEV) excluding an engine (an internal combustion engine).

Vehicle 200 further comprises an electronic control unit (hereinafter referred to as an "ECU") 230, communication equipment 240, and a touch panel display 250. ECU 230 may be a computer. ECU 230 includes a processor, a memory and a storage device (none of which is shown). Various types of vehicular control are executed by the processor executing a program stored in the memory. Note, however, that the vehicular control is not limited to execution by software, and can be executed by dedicated hardware (or electronic circuitry).

Touch panel display 250 receives a touch operation performed by the user and outputs content of the received touch operation to ECU 230. ECU 230 performs processing according to a program depending on the content of the touch operation. ECU 230 outputs a signal to touch panel display 250 for displaying a result of executing the program. Touch panel display 250 displays an image corresponding to the signal received from ECU 230.

ECU 230 is configured to communicate with an outside of vehicle 200 through communication equipment 240. Communication equipment 240 includes various communication interfaces (I/Fs). Communication equipment 240 includes a communication I/F for wirelessly communicating with server 600 (see FIG. 1) described hereinafter. Further, communication equipment 240 mounted in vehicle 200 and mobile terminal 100 are configured to communicate with each other wirelessly. ECU 230 can control mobile terminal 100 by wireless communication to cause mobile terminal 100 to notify the user. Communication between communication equipment 240 and mobile terminal 100 may be short-range communication (e.g., direct communication within a range of an interior of a vehicle and a vicinity of the vehicle).

Battery 210 includes a secondary battery such as a lithium ion battery or a nickel metal hydride battery. The secondary battery may be a battery pack or a solid-state battery. Instead of the secondary battery, another power storage device such as an electric double layer capacitor may be used.

Vehicle 200 further comprises a monitoring module 210a to monitor a state of battery 210. Monitoring module 210a includes various sensors to sense a state (e.g., voltage, current, and temperature) of battery 210, and outputs a result of sensing to ECU 230. In addition to the sensor function, monitoring module 210a may be a battery management system (BMS) further having a function to estimate state of charge (SOC), a function to estimate state of health (SOH), a function to equalize cell voltage, a function for diagnosis, and a function for communication. ECU 230 can obtain a state of battery 210 (e.g., temperature, current, voltage, SOC, and internal resistance thereof) based on an output of monitoring module 210a.

Vehicle 200 comprises MG 221 and INV 222 for electrically powered driving. MG 221 is for example a three-phase AC motor generator. MG 221 is configured to be driven by INV 222 and rotate a driving wheel W of vehicle 200. INV 222 drives MG 221 using power supplied from battery 210. Further, MG 221 performs regenerative power generation, and supplies the generated power to battery 210 via INV 222. The system to drive vehicle 200 is not limited to front wheel driving shown in FIGS. 1 and 2, and may be rear wheel driving or four wheel driving.

Vehicle 200 comprises inlet 211 and charger 212 for contact charging. Inlet 211 is configured to allow connector 311 of power feed cable 312 of charging station 300 to be connected thereto. Inlet 211 and connector 311 each have a contact incorporated therein, and when connector 311 is attached to inlet 211, the contacts come into contact with each other, and inlet 211 and connector 311 are electrically connected to each other. Hereinafter, a state in which connector 311 is connected to inlet 211 (that is, charging station 300 and vehicle 200 are electrically connected to each other via power feed cable 312) will be referred to as a "plug-in state." Further, a state in which connector 311 is disconnected from inlet 211 (that is, charging station 300 and vehicle 200 are electrically disconnected from each other) will be referred to as a "plug-out state."

Charger 212 includes a power conversion circuit (not shown). The power conversion circuit converts power that is supplied from an outside of the vehicle and received by inlet 211 into power suitable for charging battery 210. For example when charger 212 receives AC power from inlet 211, charger 212 converts the received AC power into direct-current (DC) power and supplies the DC power to battery 210. Charger 212 is controlled by ECU 230.

Server 600 included in power supply system 1 shown in FIG. 1 includes a CPU 610, a memory 620, a storage device 630, and a communication unit 640. CPU 610 is configured to perform predetermined information processing. Memory 620 is configured to store a program executed by CPU 610, and data while the program is executed. Storage device 630 is configured to be capable of saving a variety of types of information. Communication unit 640 includes various communication I/Fs. CPU 610 is configured to externally communicate via communication unit 640. Server 600 is configured to be capable of communicating with each charging station 300. Further, server 600 may be configured to communicate with vehicle 200 via charging station 300 while battery 210 is charged.

A plurality of vehicles (including vehicle 200), a plurality of users (including the user of vehicle 200), and a plurality of units of EVSE (including charging station 300) are registered in server 600. Server 600 is configured to manage each user's registered information (hereinafter also referred to as "user information"), each vehicle's registered information (hereinafter also referred to as "vehicle information"), and each EVSE's registered information (hereinafter also referred to as "EVSE information"). Information for a user terminal is included in at least one of the user information and the vehicle information. The user information, the vehicle information, and the EVSE information are stored in storage device 630 of server 600.

Identification information for identifying a user (i.e., a user ID) is provided for each user, and server 600 distinguishes the user information by the user ID for management. The user ID also functions as information for identifying a user terminal (i.e., a terminal ID). The user information for example includes a communication address and positional information of a mobile terminal carried by a user, and information for identifying a vehicle belonging to the user (i.e., a vehicle ID). Further, identification information for identifying a vehicle (i.e., a vehicle ID) is provided for each vehicle, and server 600 distinguishes the vehicle information by the vehicle ID for management. The vehicle information for example includes specifications of a vehicle (e.g., specifications for charging), and information received by server 600 from a user terminal (e.g., the vehicle's travelling plan). Further, identification information for identifying EVSE (i.e., an EVSE ID) is provided for each EVSE, and server 600 distinguishes the EVSE information by the EVSE ID for management. The EVSE information includes a connection status (plug-in state/plug-out state) of EVSE, a combination of EVSE and a vehicle in the plug-in state (a vehicle ID and an EVSE ID), and a power supply status (supply power/stop supplying power) of EVSE.

Charging station 300 having the configuration shown in FIGS. 1 and 2 may be set at a plurality of locations. These charging stations 300 may be configured to be capable of communicating with one another. They may communicate wirelessly or via a wire. Hereinafter, a layout example of a plurality of charging stations 300 will be described with reference to FIGS. 3 and 4.

Figure 3:
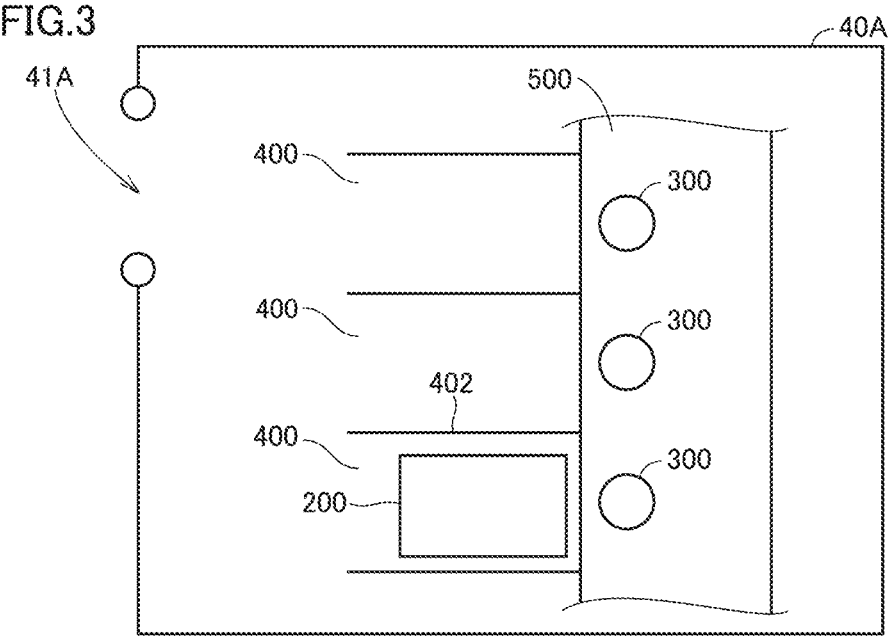
FIG. 3 is a diagram showing a first layout example of a charging station.

FIG. 3 is a diagram showing a first layout example of charging station 300. Referring to FIG. 3, in this example, a parking lot area 40A has a plurality of parking spaces 400 defined by a parking lot line 402 to be aligned laterally side by side. A foot path 500 is provided in a direction along a shorter side of each parking space 400 (i.e., a direction orthogonal to that along a longer side thereof). Foot path 500 is adjacent to each parking space 400. Charging station 300 is installed on foot path 500 at a position adjacent to each parking space 400. Charging station 300 is provided for each parking space 400. These charging stations 300 are aligned along foot path 500. Area 40A has an entrance 41A.

Figure 4:
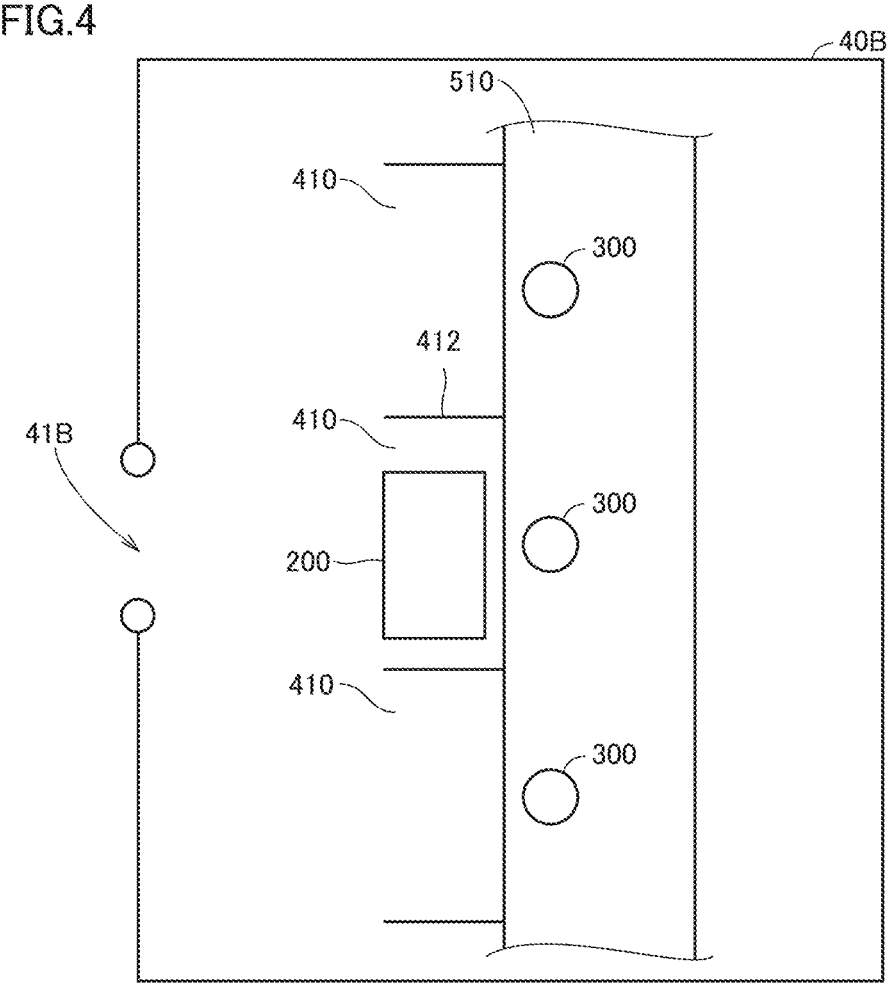
FIG. 4 is a diagram showing a second layout example of the charging station.

FIG. 4 is a diagram showing a second layout example of charging station 300. Referring to FIG. 4, in this example, a parking lot area 40B has a plurality of parking spaces 410 defined by a parking lot line 412 to be aligned longitudinally side by side. A foot path 510 is provided in a direction along a longer side of each parking space 410. Foot path 510 is adjacent to each parking space 410. Charging station 300 is installed on foot path 510 at a position adjacent to each parking space 410. Charging station 300 is provided for each parking space 410. These charging stations 300 are aligned along foot path 510. Area 40B has an entrance 41B.

When such charging station 300 as described is not used, it is accommodated under a ground surface, and it is difficult for a user to understand where charging station 300 is located or determine whether charging station 300 is available.

Accordingly, power supply system 1 comprises a plurality of charging stations 300 accommodatable under a ground surface, determines charging station 300 available for supplying power to vehicle 200 of interest, and transmits guidance information to vehicle 200 of interest for guiding vehicle 200 of interest to the determined charging station 300 by automatic driving.

Thus, vehicle 200 of interest is guided to available charging station 300 by automatic driving. As a result, the user can reach available charging station 300 without searching for it.

Initially, an example of a flow of an operation in which a user of vehicle 200 operates charging station 300 to charge battery 210 will be described. When not in use, charging station 300 is in an accommodated state (e.g., the state shown in FIG. 1).

When vehicle 200 is automatically driven and thus approaches a parking space near charging station 300, movable portion 301 of charging station 300 starts to elevate. Movable portion 301 is elevated to a position in which connector 311 of power feed cable 312 is easily connected to inlet 211 of vehicle 200 (for example, position Px shown in FIG. 2). Thus, charging station 300 enters a state ready for plug-in. Hereinafter, a state in which movable portion 301 is elevated to a position ready for plug-in will also be referred to as an "elevated state."

For example, when charging station 300 is in the elevated state shown in FIG. 2, the user takes out power feed cable 312 from the cable accommodating portion of movable portion 301 and extends power feed cable 312 toward vehicle 200. Then, the user connects connector 311 of power feed cable 312 to inlet 211 of vehicle 200. Thus, vehicle 200 and charging station 300 enter the plug-in state. In the plug-in state, vehicle 200 and charging station 300 can perform communication therebetween and transmit and receive power therebetween. ECU 230 of vehicle 200 communicates with control device 330 of charging station 300 via power feed cable 312.

The user operates charging station 300 in the plug-in state to cause charging station 300 to supply power. Charging station 300 starts supplying power in accordance with an instruction received from the user. Specifically, in charging station 300, power supply circuit 310 receives AC power supplied from AC power supply 350, converts (e.g., transforms) the received AC power into AC power suitable for feeding vehicle 200, and supplies the converted power to power feed cable 312. In the plug-in state, power supplied from power supply circuit 310 to power feed cable 312 is input to inlet 211 of vehicle 200. Then, vehicle 200 has battery 210 charged. Specifically, the power input to inlet 211 is supplied to battery 210 via charger 212. While battery 210 is charged, control device 330 controls power supply circuit 310 to adjust power to be supplied, and ECU 230 controls charger 212 to adjust power to be charged. Thus, charging station 300 is configured to charge a power storage device mounted in a vehicle.

Thereafter when charging battery 210 is completed, the user operates charging station 300 to stop supplying power.

It should be noted, however, that when battery 210 is fully charged, a stop instruction is automatically sent from ECU 230 to control device 330. In response to the stop instruction, charging station 300 stops supplying power. Thereafter, the user pulls out connector 311 of power feed cable 312 from inlet 211 of vehicle 200 and accommodates power feed cable 312 in the cable accommodating portion. Thus, vehicle 200 and charging station 300 enter the plug-out state. When the user returns power feed cable 312 to the cable accommodating portion, control device 330 lowers movable portion 301 to lower limit position P1 of movability range R2. When the position of movable portion 301 reaches lower limit position P1, ground surface F1 is flush with top surface 301a of movable portion 301. In this way, charging station 300 again enters the accommodated state.

Figure 5:
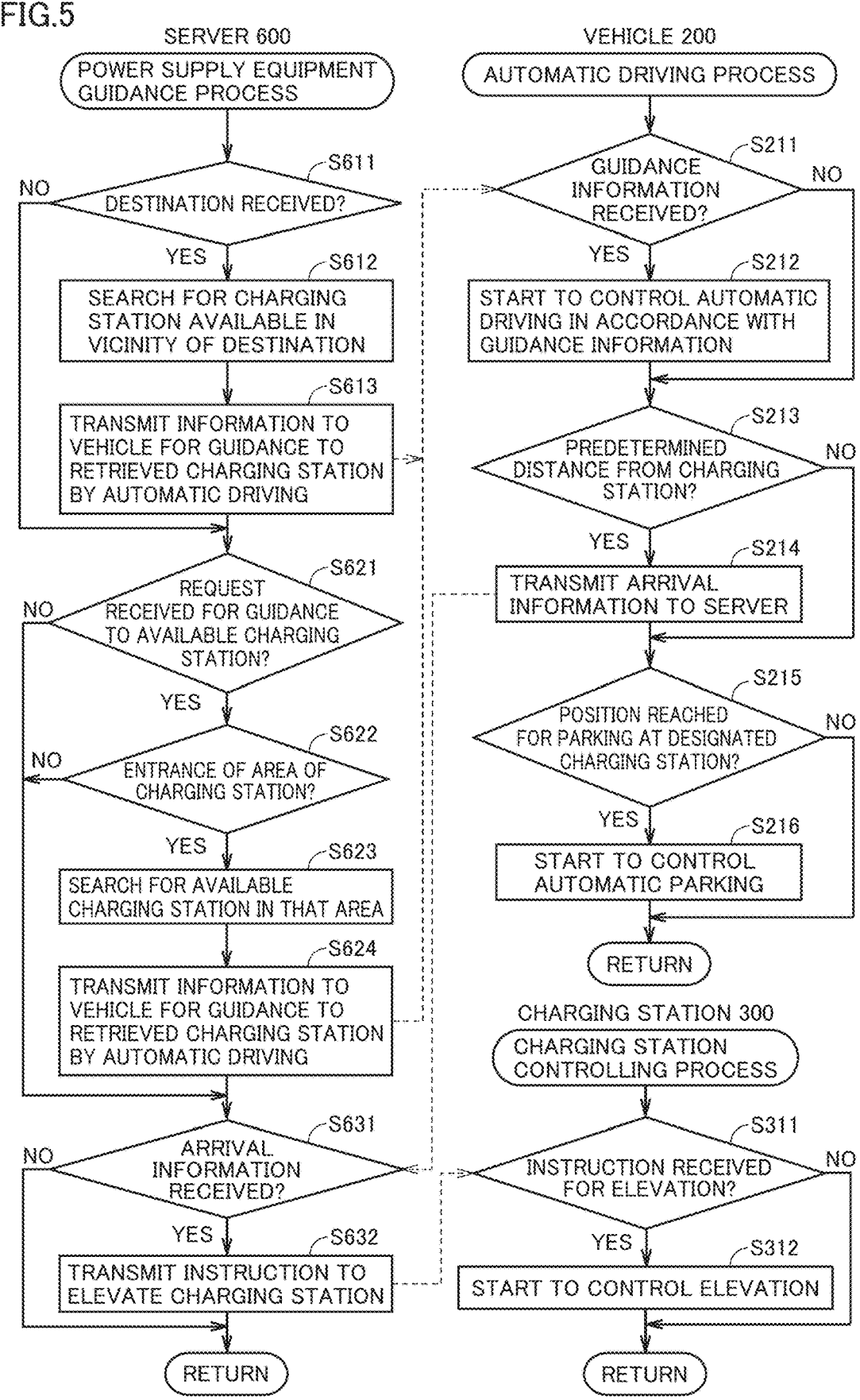
FIG. 5 is a flowchart of a process performed in a power supply system according to a first embodiment before a vehicle reaches a charging station.

FIG. 5 is a flowchart of a process performed in power supply system 1 according to the first embodiment before vehicle 200 reaches charging station 300. Referring to FIG. 5, in server 600, CPU 610 determines whether communication unit 640 has received from a user's vehicle 200 information indicating a destination (step S611). In vehicle 200, the destination is input to ECU 230 by operating touch panel display 250, for example. The information indicating the destination may not be received from vehicle 200 of the user, and may be received from another device (for example, a mobile terminal of the user).

When it is determined that the information indicating the destination is received (YES in step S611), CPU 610 searches database information of charging station 300 stored in storage device 630 for charging station 300 available in a vicinity of the destination (step S612). The vicinity of the destination may be a range satisfying a predetermined condition indicating that it is close to the destination, and may for example be a range reachable from the destination by vehicle 200 in a predetermined period of time (for example, a few minutes such as 5 minutes and 10 minutes) or a range of a predetermined distance (for example, a few km such as 1 km and 2 km) from the destination.

Then, CPU 610 controls communication unit 640 to transmit guidance information to vehicle 200 for guiding vehicle 200 to a retrieved charging station 300 by automatic driving (step S613). The guidance information includes at least positional information of charging station 300 to which vehicle 200 is guided, and the guidance information may include information indicating a route to that charging station 300. Further, when the guidance information is transmitted to vehicle 200, reservation information including a scheduled time to start charging (=a scheduled arrival time) may be transmitted to charging station 300 to which vehicle 200 is guided, so that charging can be started at the scheduled arrival time. The reservation information may include information for determining a charging period of time (for example, the SOC of battery 210 of vehicle 200 at that point in time, and a charging period of time desired by a user).

In charging station 300, when a charging period of time desired by a user is received, processor 331 of control device 330 can recognize that vehicle 200 is scheduled to use charging station 300 until a scheduled time to end charging, as obtained by adding the received charging period of time to the scheduled arrival time of vehicle 200, arrives. Charging station 300 can thus determine a time at which a next vehicle can start using charging station 300.

In charging station 300, when an SOC which battery 210 of vehicle 200 has at that point in time is received, processor 331 of control device 330 can estimate an SOC which battery 210 has when vehicle 200 arrives at charging station 300, and processor 331 can calculate a charging period of time taken to fully charge battery 210 having the estimated SOC, and thus recognize that vehicle 200 is scheduled to use charging station 300 until a scheduled time to end charging, as obtained by adding the calculated charging period of time to the scheduled arrival time of vehicle 200, arrives. Charging station 300 can thus determine a time at which a next vehicle can start using charging station 300.

In vehicle 200, ECU 230 determines whether the guidance information has been received from server 600 (step S211). When it is determined that the guidance information has been received (YES in step S211), ECU 230 starts to control automatically driving vehicle 200 in accordance with the guidance information (step S212). For example, ECU 230 determines a route to charging station 300 indicated by positional information included in the guidance information, and controls automatically driving vehicle 200 to cause vehicle 200 to travel along the route. When the guidance information includes information indicating a route to charging station 300, ECU 230 controls automatically driving vehicle 200 to cause vehicle 200 to travel along the route indicated by the information included in the guidance information.

In server 600, CPU 610 determines whether a request for guidance to an available charging station 300 has been received from vehicle 200 of the user via communication unit 640 (step S621). In vehicle 200, the request for guidance is input to ECU 230 by operating touch panel display 250, for example. The request for guidance may not be received from vehicle 200 of the user, and may be received from another device (for example, a mobile terminal of the user). When it is determined that the request for guidance has been received (YES in step S621), CPU 610 determines whether vehicle 200 assumes a position in a vicinity of an entrance of any of a plurality of areas 40A and 40B in which any of the plurality of charging stations 300 is installed (step S622).

When it is determined that vehicle 200 assumes a position in a vicinity of an entrance of an area of any charging station 300 (YES in step S622), CPU 610 searches for available charging station 300 in that area (step S623), and, similarly as done in step S613, controls communication unit 640 to transmit guidance information to vehicle 200 for guiding vehicle 200 to a retrieved charging station 300 by automatic driving (step S624). In vehicle 200, automatic driving is controlled as has been described in step S211, in which guidance information is received, and step S212.

In vehicle 200, when it is determined that the guidance information has not been received (NO in step S211), or after step S212, ECU 230 of vehicle 200 determines whether vehicle 200 has reached a predetermined distance from charging station 300 (step S213). The predetermined distance is for example an approximate distance for which the user can visually observe charging station 300, and specifically, it is several tens of meters. While herein ECU 230 determines whether vehicle 200 has reached a predetermined distance from charging station 300, this is not exclusive, and ECU 230 may determine whether vehicle 200 has reached entrances 41A and 41B of areas 40A and 40B in which charging station 300 is installed. It is believed that a user at entrances 41A and 41B of areas 40A and 40B in which charging station 300 is installed can visually recognize charging station 300 in many cases.

When it is determined that vehicle 200 has reached the predetermined distance from charging station 300 (YES in step S213), arrival information indicating that vehicle 200 has arrived is transmitted to server 600 (step S214).

In server 600, CPU 610 determines whether the arrival information has been received from vehicle 200 by communication unit 640 (step S631). When it is determined that the arrival information has been received (YES in step S631), CPU 610 controls communication unit 640 to transmit an instruction to charging station 300 to which vehicle 200 is guided to elevate movable portion 301 (step S632).

In charging station 300, processor 331 of control device 330 determines whether the instruction to elevate the movable portion has been received from server 600 via communication device 341 and communication unit 335 (step S311). When it is determined that the instruction to elevate the movable portion has been received (YES in step S311), processor 331 controls actuator 320 to start to control elevating movable portion 301 (step S312).

In vehicle 200, ECU 230 determines whether vehicle 200 has reached a position to start parking the vehicle in the parking space of charging station 300 designated by the guidance information (step S215). When it is determined that the vehicle has reached the parking space (step S215), ECU 230 starts to control automatically parking the vehicle in the parking space (step S216).

From a point in time at the predetermined distance from charging station 300, the user can visually recognize from the automatically driven vehicle 200 charging station 300 at which movable portion 301 starts to elevate. When automatically parking the vehicle is completed, charging station 300 has movable portion 301 in an elevated state. The user gets off vehicle 200, and performs an operation for charging, as described above.

Second Embodiment

In the first embodiment, as shown in FIG. 5, server 600 searches for available charging station 300 in an area of a parking lot in which charging station 300 is installed, and server 600 provides guidance in the area of the parking lot to that charging station 300. In the second embodiment, searching for available charging station 300 in an area of a parking lot in which charging station 300 is installed, and guidance in the area of the parking lot to that charging station 300, are performed by a main charging station 300 in the area of that parking lot.

FIG. 6 is a flowchart of a process performed in power supply system 1 according to a second embodiment before vehicle 200 reaches charging station 300. Referring to FIG. 6, any step of the same step number as FIG. 5 has been described with reference to FIG. 5, and accordingly, will not be described redundantly.

In server 600, CPU 610 controls communication unit 640 to transmit guidance information to vehicle 200 for guiding vehicle 200 by automatic driving to an area of a parking lot in which charging station 300 retrieved in step S612 is installed (step S613A).

In vehicle 200, ECU 230 determines whether vehicle 200 has reached an area of charging station 300 to which the vehicle is guided (step S213A). When it is determined that the vehicle has reached the area (YES in step S213A), ECU 230 transmits a request to a main charging station 300 of that area for guidance to have the vehicle guided to charging station 300 designated by the guidance information received in step S211 (step S214A).

In the main charging station 300 of the area, processor 331 of control device 330 determines whether the request for guidance has been received from vehicle 200 (step S301). When it is determined that the request for guidance has been received (YES in step S301), charging station 300 available in that area is searched for (step S302). When charging station 300 indicated by the request for guidance is available, charging station 300 indicated by the request for guidance will be a search result.

Processor 331 controls communication unit 335 to transmit guidance information to vehicle 200 via communication device 341 for guiding vehicle 200 to a retrieved charging station 300 by automatic driving (step S303). In vehicle 200, when the guidance information is received, automatic driving is controlled as described in the FIG. 5 steps S211 and S212.

Processor 331 controls communication unit 335 to transmit an instruction to the retrieved charging station 300 via communication device 341 to elevate movable portion 301 (step S304). In charging station 300, when the instruction to elevate movable portion 301 is received, elevating movable portion 301 of charging station 300 is controlled as described in the FIG. 5 steps S311 and S312.

[Exemplary Variation]
(1) In the above-described embodiments, actuator 320 is controlled to displace movable portion 301 of charging station 300 to an upper limit position, as timed as prescribed for parking in a parking space of an area of charging station 300, such as at a time when vehicle 200 arrives at a predetermined distance from charging station 300 as described in the first embodiment with reference to FIG. 5, or at a time when vehicle 200 arrives at an area of charging station 300 as described in the second embodiment with reference to FIG. 6. This is not exclusive, however, and actuator 320 may be controlled to displace movable portion 301 of charging station 300 to the upper limit position, as timed for parking at a power supplying position for power supply equipment such as charging station 300, for example at a time when vehicle 200 starts automatic parking at the power supplying position for the power supply equipment, or at a time when vehicle 200 has reached a position predetermined for each charging station 300.
(2) As indicated in the above-described embodiments, the guidance information for guiding vehicle 200 of interest to a determined charging station by automatic driving may be information for guiding vehicle 200 of interest to charging station 300 available in a vicinity of a destination set by a user, as indicated in the FIGS. 5 and 6 step S613, or information for guiding vehicle 200 of interest from an entrance of an area having charging station 300 installed therein to available charging station 300, as indicated in the FIG. 5 step S624 and the FIG. 6 step S303.
(3) In the above-described embodiments, as shown in the FIG. 5 steps S622 and S624, the guidance information is transmitted to vehicle 200 at a time when vehicle 200 arrives at an entrance of an area of charging station 300. Further, as indicated in the FIG. 6 steps S213A and S303, the guidance information is transmitted to vehicle 200 at a time when vehicle 200 arrives at an area of charging station 300. This is not exclusive, however, and the guiding information may be transmitted at a time when vehicle 200 of interest arrives at a predetermined position for power supply equipment such as charging station 300, and may for example be transmitted at a time when vehicle 200 arrives at a point of a predetermined distance from the power supply equipment or a time when vehicle 200 arrives at a position predetermined for each power supply equipment.

(4) In the embodiments described above, power supply equipment such as charging station 300 may supply vehicle 200 with AC power or DC power.

(5) In the embodiments described above, power supply equipment such as charging station 300 is adapted to supply power to an electrically driven vehicle such as vehicle 200. This is not exclusive, however, and the power supply equipment may supply power to transportation, or drones, mobile robots or any other devices that include battery 210 and require being fed with power, and the power supply equipment may supply power to a plug-in hybrid electric vehicle (PHEV).

(6) The above-described embodiments can be regarded as a disclosure of power supply system 1, a disclosure of power supply equipment such as charging station 300, server 600 or vehicle 200, and a disclosure of a method for controlling power supply system 1, the power supply equipment, server 600, or vehicle 200.

SUMMARY (1) As shown in FIGS. 1 and 2, power supply system 1 includes a plurality of charging stations 300 accommodatable under a ground surface. As shown in FIGS. 1, 2, 5, and 6, power supply system 1 comprises: a determination unit that determines power supply equipment available for supplying power to vehicle 200 of interest, (for example, CPU 610 of server 600 executing steps S612 and S623 in FIG. 5 and step S612 in FIG. 6, and processor 331 of control device 330 of charging station 300 executing step S302 in FIG. 6); and a transmission unit that transmits guidance information to vehicle 200 of interest for guiding vehicle 200 of interest to the determined charging station 300 by automatic driving (for example, CPU 610 and communication unit 640 of server 600 executing steps S613 and S624 in FIG. 5, and processor 331 and communication unit 335 of control device 330 of charging station 300 executing step S303 in FIG. 6).

Thus, charging station 300 available for supplying power to vehicle 200 of interest is determined, and guidance information is transmitted to vehicle 200 of interest for guiding vehicle 200 of interest to the determined charging station 300 by automatic driving. Thus, vehicle 200 of interest is guided to available charging station 300 by automatic driving. As a result, the user can reach available charging station 300 without searching for it.

(2) As shown in FIGS. 1 and 2, charging station 300 comprises: movable portion 301 that has a power supply port (for example, connector 311, and a connector provided for power feed cable 312 and being a portion to which power feed cable 312 is attached) and is displaced within a movability range including a first position in which the power supply port is accommodated under the ground surface (e.g., a position in an accommodated state or lower limit position P1) and a second position in which the power supply port is exposed on the ground surface (e.g., upper limit position P2); actuator 320 that moves movable portion 301; and control device 330 that controls actuator 320.

As shown in FIGS. 3 to 6, control device 330 of charging station 300 determined by the determination unit may control actuator 320 to displace movable portion 301 to the second position, as timed as prescribed for parking vehicle 200 of interest in parking space 400, 410 at that charging station 300 (for example, in the first embodiment with reference to FIG. 5, at a time when an instruction for elevation is received in charging station 300 on a condition that vehicle 200 has reached a predetermined distance from charging station 300 in step S213, and in the second embodiment with reference to FIG. 6, at a time when an instruction for elevation is received in charging station 300 on a condition that vehicle 200 has arrived at an area of charging station 300 in step S213A).

Thus, the determined charging station 300 has movable portion 301 displaced to the second position in which the power supply port is exposed on the ground surface, as timed as prescribed for parking vehicle 200 of interest in parking space 400, 410 of that charging station 300. As a result, the user can visually recognize elevation of movable portion 301 of charging station 300, which can present a sense of welcomeness to the user and thus receive a high level of satisfaction from the user.

(3) As shown in FIGS. 1, 2, and 6, charging station 300 may comprise a determination unit (for example, processor 331 of control device 330 of charging station 300 executing step S302 in FIG. 6) and a transmission unit (for example, processor 331 and communication unit 335 of control device 330 of charging station 300 executing step S303 in FIG. 6).

(4) As shown in FIGS. 1 and 2, power supply system 1 further includes server 600 capable of communicating with charging station 300. As shown in FIGS. 1, 2, 5 and 6, server 600 may comprise a determination unit (for example, CPU 610 of server 600 executing steps S612 and S623 in FIG. 5 and step S612 in FIG. 6) and a transmission unit (for example, CPU 610 and communication unit 640 of server 600 executing steps S613 and S624 in FIG. 5).

(5) As shown in FIGS. 5 and 6, the determination unit may determine charging station 300 available for supplying power in a vicinity of a destination of vehicle 200 of interest (e.g., step S612 in FIGS. 5 and 6).

(6) As shown in FIGS. 5 and 6, the transmission unit may transmit the guidance information to vehicle 200 of interest at a time when charging station 300 is determined (e.g., step S613 in FIG. 5 and step S613A in FIG. 6).

(7) As shown in FIGS. 5 and 6, the transmission unit may transmit the guidance information to vehicle 200 of interest at a time when the vehicle of interest reaches a predetermined position for charging station 300 determined by the determination unit (for example, when it is determined in the FIG. 5 step S622 that vehicle 200 has reached an entrance of an area of charging station 300, and when it is determined in the FIG. 6 step S213A that vehicle 200 has reached the area of charging station 300) (e.g., step S624 in FIG. 5 and step S303 in FIG. 6).

Although the embodiments of the present invention have been described, it should be considered that the embodiments disclosed herein are illustrative and non-restrictive in every respect. The scope of the present invention is defined by the terms of the claims, and is intended to include any modifications within the scope and meaning equivalent to the terms of the claims.

What is claimed is:

1. A power supply system, comprising:
a plurality of power supply facilities, each of the plurality of power supply facilities accommodatable under a ground surface, said each of the plurality of power supply facilities including:

a movable portion including:
  a touch panel display configured to receive instructions for supplying power to a target vehicle, and
  a power supply port, wherein the movable portion is displaced within a movability range including a first position in which the power supply port is accommodated under the ground surface and a second position in which the power supply port is exposed on the ground surface,
  an actuator configured to move the movable portion, and
  a controller configured to control the actuator;
a determination unit configured to determine, among the plurality of power supply facilities, a power supply facility available for supplying the power to the target vehicle; and
a transmitter configured to transmit, to the target vehicle, guidance information for guiding the target vehicle to the determined power supply facility by automatic driving, wherein
the controller of the determined power supply facility is configured to
  control the actuator to displace the movable portion to the second position, as timed as prescribed for parking the target vehicle at a power supplying position for the determined power supply facility, and
  in response to the target vehicle automatically driven and approaching the determined power supply facility, control the actuator to displace the movable portion from the first position to the second position.

2. The power supply system according to claim 1, wherein said each of the plurality of power supply facilities includes the determination unit and the transmitter.

3. The power supply system according to claim 1, further comprising:
a server configured to communicate with said each of the plurality of power supply facilities, wherein the server includes the determination unit and the transmitter.

4. The power supply system according to claim 3, wherein the determination unit is configured to determine the power supply facility available for supplying the power in a vicinity of a destination of the target vehicle.

5. The power supply system according to claim 3, wherein the transmitter is configured to transmit the guidance information to the target vehicle at a time when the power supply facility is determined.

6. The power supply system according to claim 1, wherein the transmitter is configured to transmit the guidance information to the target vehicle at a time when the target vehicle reaches a predetermined position for the power supply facility determined by the determination unit.

7. The power supply system according to claim 1, further comprising:
a server configured to communicate with said each of the plurality of power supply facilities, wherein the server includes the determination unit and the transmitter, and
the server is further configured to
  determine whether the transmitter has received, from the target vehicle, information indicating a destination of the target vehicle, and
  in response to determining that the information indicating the destination is received,
    search for the power supply facility available in a vicinity of the destination, and
    transmit the guidance information to the target vehicle.

8. The power supply system according to claim 7, wherein the server is further configured to
  in response to transmitting the guidance information to the target vehicle, determine whether a request for guidance to the determined power supply facility has been received from the target vehicle, and
  in response to determining that the request for guidance has been received, determine whether the target vehicle assumes a position in a vicinity of an entrance of an area in which the plurality of power supply facilities including the determined power supply facility is installed,
  in response to determining that the target vehicle assumes the position,
    search for the determined power supply facility in the area, and
    transmit the guidance information to the target vehicle, and
  in response to transmitting the guidance information to the target vehicle, determining whether arrival information indicating an arrival of the target vehicle at a predetermined distance from the determined power supply facility has been received from the target vehicle, and
  in response to determining that the arrival information has been received, transmit an instruction to the determined power supply facility to elevate the movable portion.

9. The power supply system according to claim 8, wherein the controller of the determined power supply facility is configured to
  determine whether the instruction to elevate the movable portion has been received from the server, and
  in response to determining that the instruction to elevate the movable portion has been received, control the actuator to elevate the movable portion.

10. The power supply system according to claim 9, wherein
the target vehicle further comprises a processor configured to
  determine whether the guidance information has been received from the server,
  in response to determining that the guidance information has been received,
    start to control automatically driving the target vehicle in accordance with the guidance information, and
    determine whether the target vehicle has reached the predetermined distance,
  in response to determining that the target vehicle has reached the predetermined distance, transmit the arrival information to the server,
  determine whether the target vehicle has reached a further position to start parking the target vehicle in the power supplying position, and
  in response to determining that the target vehicle has reached the further position, start to control automatically parking the target vehicle in the power supplying position.

11. The power supply system according to claim 7, wherein
the plurality of power supply facilities further comprises a main charging station configured to
determine whether a request for guidance to the determined power supply facility has been received from the target vehicle, and
in response to determining that the request for guidance has been received,
search for the determined power supply facility,
transmit the guidance information to the target vehicle, and
transmit an instruction to the determined power supply facility to elevate the movable portion of the determined power supply facility.

12. The power supply system according to claim 11, wherein
the controller of the determined power supply facility is configured to
determine whether the instruction to elevate the movable portion has been received from the main charging station, and
in response to determining that the instruction to elevate the movable portion has been received, control the actuator to elevate the movable portion.

13. The power supply system according to claim 12, wherein
the target vehicle further comprises a processor configured to
determine whether the guidance information has been received from the server,
in response to determining that the guidance information has been received,
start to control automatically driving the target vehicle in accordance with the guidance information, and
determine whether the target vehicle has reached an area of the determined power supply facility,
in response to determining that the target vehicle has reached the area, transmit a request to the main charging station of the area for guidance to have the target vehicle guided to the determined power supply facility designated by the guidance information,
determine whether the target vehicle has reached a further position to start parking the target vehicle in the power supplying position, and
in response to determining that the target vehicle has reached the further position, start to control automatically parking the target vehicle in the power supplying position.

* * * * *